May 4, 1954     A. V. BEDFORD     2,677,722
COLOR TELEVISION IMAGE REPRODUCER

Filed Dec. 31, 1949     2 Sheets-Sheet 1

INVENTOR
Alda V. Bedford
ATTORNEY

May 4, 1954     A. V. BEDFORD     2,677,722
COLOR TELEVISION IMAGE REPRODUCER
Filed Dec. 31, 1949     2 Sheets-Sheet 2

INVENTOR
Alda V. Bedford
BY
ATTORNEY

Patented May 4, 1954

2,677,722

UNITED STATES PATENT OFFICE 2,677,722

COLOR TELEVISION IMAGE REPRODUCER

Alda V. Bedford, Princeton, N. J., assignor to Radio Corporation of America, a corporation of Delaware Application December 31, 1949, Serial No. 136,252

14 Claims. (Cl. 178—5.4)

This invention relates to apparatus for forming a fully colored image from a plurality of differently colored monochromatic images.

One of the problems of present day color television is the provision of apparatus that is capable of reproducing colored images having high level of illumination and large resolution. For such a system to be commercially useful, it must not be too large and must be inexpensive to manufacture.

In one type of known apparatus, the images corresponding to the different component colors are separately formed and projected onto a single viewing surface by optical means. The production of an image having the required detail at a high level of illumination requires a high degree of precision. The necessarily small size of the projection tubes and the light required makes difficult the design of a sufficiently fast lens that does not produce chromatic or spherical aberration.

In another arrangement wherein an increase in the brightness with improved definition is obtained, a first colored image is viewed through a pair of partially reflecting mirrors, the reflection of a second colored image being seen by way of one of the mirrors and the reflection of a third colored image may be seen by way of the other mirror. To the observer, however, the image appears in a plane located quite far within the cabinet, a phenomenon called the "tunnel effect," and accordingly the viewing angle is limited and close viewing is made difficult.

In order to increase the angle through which an image formed in this manner may be viewed, a reduction by a factor of about two in the distance between the apparent plane of the image and the opening in the cabinet through which it is observed has been previously obtained by employing crossed dichroic mirrors. In its most usual form, three similar direct view kinescopes are employed to form the separate images and are positioned on three different axes. The face of one kinescope is directly viewed through both of the crossed dichroic mirrors and each of the images formed by the other two kinescopes are seen as a reflection in one of the mirrors.

According to one aspect of this invention, but a single partially reflecting mirror, which may have dichroic characteristics or may be half silvered, is employed so that the efficiency of light transmission from the separately formed images to the viewer is increased.

Briefly, this may be accomplished by projecting one of the monochromatic images onto the face of a kinescope where another colored image is reproduced. This is possible because the phosphors employed in kinescopes diffuse the light falling on them so as to form a screen on which real projected images may be viewed.

One additional advantageous result flowing from this arrangement is the reduction in size of the receiver that is made possible by the use of a small projection kinescope to replace one of the larger direct viewing kinescopes.

In accordance with normal procedure, the substitution of a projection tube for a direct view kinescope would lower the light level of the image, but in accordance with one aspect of this invention, an actual increase in the effective brightness of the final image can be obtained. By increasing the ratio of the cross sectional area of the scanning beam to the area of the raster scanned, the amount of light contributed by the projection tube can be increased. This has the effect of decreasing the available definition, as it is a function of this ratio, but no defect can be observed if the projection tube with the increased spot size is employed to project the blue image because the eye's acuity for blue light is far below that of the other colors.

It is the object of this invention to provide an improved apparatus for reproducing images in full color.

Another object of the invention is to provide a more compact and economical color television image reproducer.

These and other objects of the invention will become apparent from a detailed description of the drawings in which.

Figure 1:
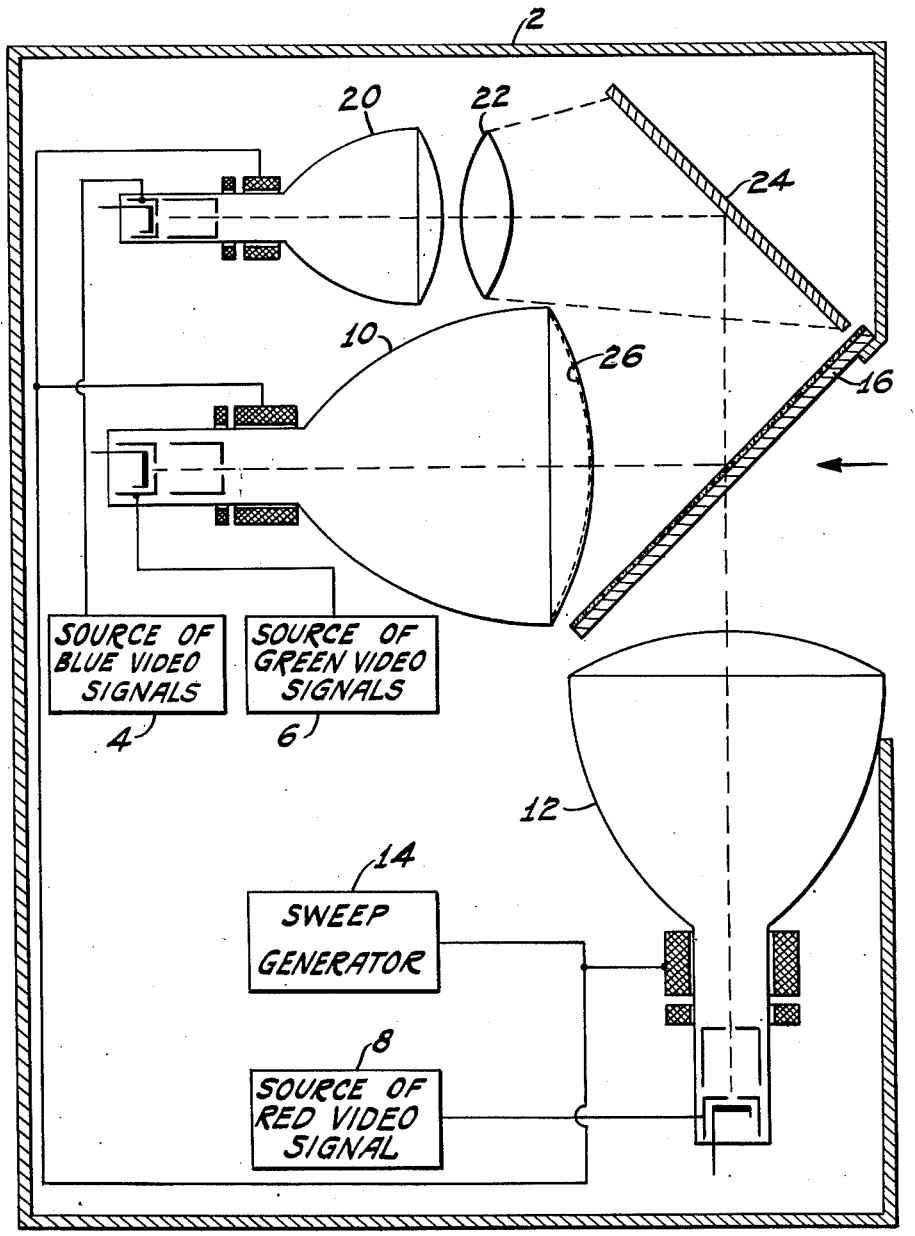
Figure 1 illustrates by block diagram a color television receiver embodying the principles of this invention.

Referring now in detail to Figure 1, there is shown in schematic and block diagram form a receiver enclosed in a cabinet 2 having three sources 4, 6 and 8 of video signals that vary in accordance with the intensity of the component colors of the scanned image. Source 6 in this illustrative example will be assumed to provide green video signals to cathode ray tube 10 of the direct view type, and the source 8 of the red video signals is applied in a similar manner to the direct view tube 12. A sweep generator 14 which may be of standard construction supplies sweep voltages to the deflection circuits of the tubes 10 and 12 respectively. High voltage anode supplies, not shown, are provided for both kinescopes. The longitudinal axis of each of the cathode ray tubes 10 and 12 respectively are mutually perpendicular and a semi-reflecting mirror 16 is placed in a symmetrical position with respect to them. The mirror 16 may be half silvered in a manner well known to those skilled in the art. In accordance with this construction then, approximately fifty percent of the light formed in the green image of the cathode ray tube 10 will pass through the half silvered mirror 16 and fifty percent of the red image that is formed on the face of the cathode ray tube 12 will be reflected by the half silvered mirror 16. Inasmuch as the mirror is symmetrically positioned with respect to the images formed by these two cathode ray tubes, they will appear to be superimposed in the same plane.

The source of blue video signals is connected to a small projection type tube 20, which also receives its sweep voltage from sweep generator 14. In the arrangement shown, cathode ray tube 20 is positioned with its longitudinal axis parallel to the longitudinal axis of cathode ray tube 10 and facing in the same direction. The blue image formed thereon is projected by the lens system 22 toward a reflecting surface 24 mounted so that it makes an angle of 45 degrees with a principal axis of tube 20. Larger viewing angles can be obtained by increasing the angle between the faces of tubes 10 and 12 beyond ninety degrees and extending the mirror 16, which is still half way between the faces. The lens system need not be fast, as aberrations present in the blue image are not readily apparent to the eye. The light from the blue image reflected by the mirror 24 therefore will fall on the half silvered mirror 16 and fifty percent of its light will be reflected to the face of the cathode ray tube 10 to form a real enlarged image thereon. As previously pointed out, the phosphors normally employed in present day kinescopes are of such nature as to diffusely reflect light that falls upon them, and therefore, the layer of phosphor 26 that is deposited on the inner face of the cathode ray tube 10 forms a screen upon which this blue image is projected. It is to be understood that the phosphor on which the image is projected could be located at other places than the inner surface of the glass wall at the front of the tube, and therefore, for purposes of this discussion, face means the phosphored surface on which images are formed. Fifty percent of the blue light in this projected image will pass through the half silvered mirror 16 and therefore, neglecting other light losses, one quarter of the blue light originally supplied by the cathode ray tube 20 will reach the observer. In this way, all the images will appear as though they originate at the face of the cathode ray tube 10. In order to improve the registry of the blue image with the other images formed on the usually curved surfaces of the direct view tube 10, the phosphor screen of projection tube 20 on which the blue image is formed may be curved. Furthermore, reflections from the side of mirror 16 that is toward the observer may be prevented from interfering with the final image by applying a thin coating or by etching it slightly in a manner well known to those skilled in the art.

The amount of blue light provided by the projection tube 20 can be increased by increasing the cross sectional area of the beam therein in a manner well known to those skilled in the art. In this way, the ratio of the cross sectional area of the beam to the area of the blue image formed on the face of tube 20 is greater than the ratio between the cross sectional areas of the beams to the image areas of the tubes 10 and 12. For example, if the diameter of the spot employed in projection tube 20 is three times larger than normal, the amount of light provided by the projection tube 20 will be at least nine times greater. This, of course, means a reduction in the available definition in the blue content of the final image. However, as mentioned above, this can be tolerated as the mount of definition seen by the eye in a blue image is not nearly as great as the definition seen in the images of other colors. In this illustrative example, therefore, the amount of blue light will actually be increased by a factor of 2¼ over that usually obtained by projection of color images.

Further relative increase in the brightness of the blue image can be obtained by using a higher anode voltage on the blue kinescope. If this is done, the ratio of the higher and the lower anode voltages should be kept constant to retain registration of the images.

Figure 2:
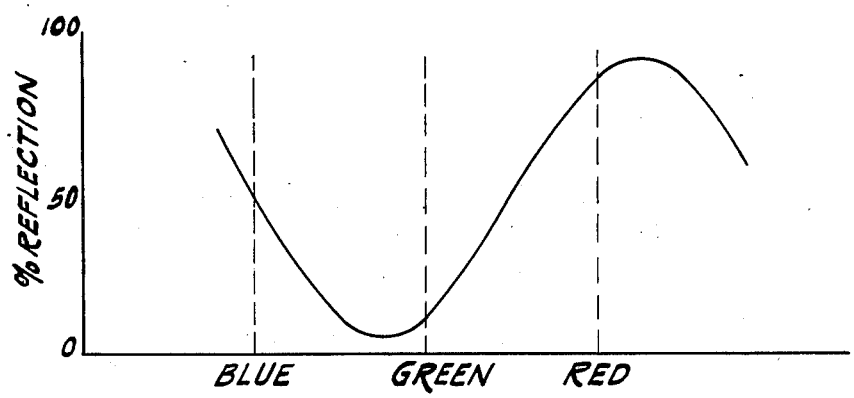
Figure 2 shows graphically a curve illustrating the characteristics of the dichroic mirrors that may be employed in such a receiver.

The partially reflecting surface 16 may be a series of thin layers so as to form a dichroic mirror. Such a mirror is well described in the "Society of Motion Picture Engineer's Journal" for January 1942 beginning on page 36. A typical mirror of this sort may have a reflection characteristic such as indicated in Figure 2. The center of the red spectrum which is formed by cathode ray tube 12 is seen to occur at a point in this characteristic that is highly reflective and therefore the image formed by cathode ray tube 12 will be largely reflected towards the observer along the axis of cathode ray tube 10. The center of the green spectrum formed by cathode ray tube 10 is located at a portion of the characteristic curve that has low reflection, and therefore a large percentage of the green image will pass through the partially reflecting surface 16 toward the observer. On the other hand, the center of the blue spectrum formed on the face of the projection tube 20 is seen to occur at a point which is substantially midway between the reflection of the red and the reflection of the green. Assuming that this point occurs at fifty percent reflection then, one quarter of the blue light provided by the projection tube 20 will eventually pass to the observer in a manner similar to that discussed in connection with a half silvered mirror. However, a gain in the brilliance of the red and green images is brought about because greater percentages of them will be either transmitted or reflected, than when a half silvered mirror was employed.

It will be appreciated that the use of a projection tube in a manner just described permits a considerable reduction in the size of the cabinet 2, a characteristic of great practical importance.

Figure 3:
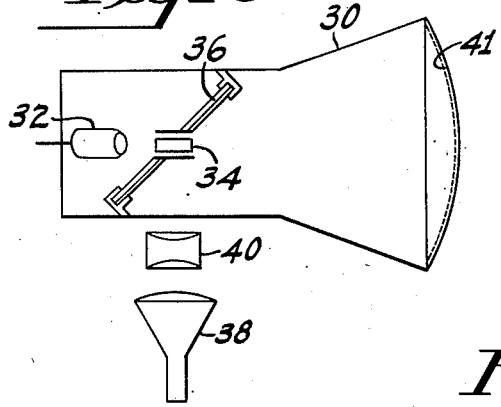
Figure 3 illustrates another apparatus for projecting one of the colored images onto the surface on which another image is formed.
Figure 4:
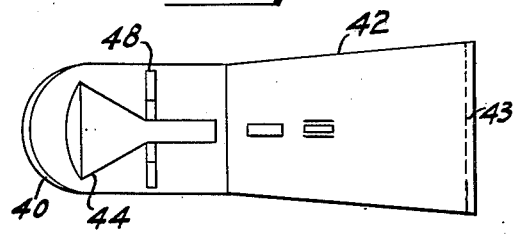
Figures 4 and 5 show other arrangements in accordance with this invention for projecting one of the colored images onto the inside surface on which a different colored image is formed.
Figure 5:
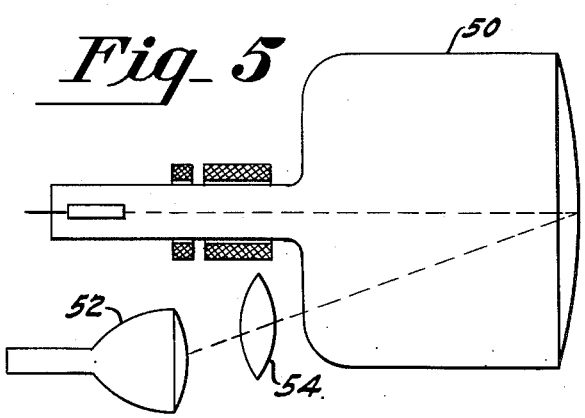

Other methods of projecting the blue image onto the phosphorescent surface of the cathode ray tube on which an image of a different color is formed are illustrated in the Figures 3-5. The arrangement shown in Figure 3 is comprised of an envelope 30 having a neck of considerably larger diameter than that normally employed. A beam of electrons is projected toward the face 41 of the tube by gun 32 in the normal manner, and passes between two pairs of electrostatic deflection plates generally indicated by the numeral 34. The electrical connections to these plates are not shown for purposes of simplicity and they may be physically mounted in any suitable manner. The novel feature of the tube lies in the position of a mirror 36 which is shown in the tube and makes an angle of 45 degrees with respect to the longitudinal axis of the tube. The image formed by the projector tube 38 is projected through the lens system 40 onto the mirror 36 at such an angle that it is reflected onto the inner face of the envelope 41. Inasmuch as the phosphors deposited on this inner face transmit light, the projected image will be visible from the front of the tube.

In another arrangement, such as illustrated in Figure 4, the projector tube is mounted with its axis coincident with the longitudinal axis of a cathode ray tube which may take the form of a truncated cone as indicated by the numeral 42. In this arrangement, the projection tube 44 faces the opposite direction from the direct view tube 42 and its image is reflected by the spherical mirror 46 and through a correcting lens 48 onto the inside surface of the face 43 of the tube 42 and it therefore coincides with the image that is formed by the tube 42 in a standard manner.

In the arrangement shown in Figure 5 a cathode ray tube 50 that functions in a normal manner, is flanged outwardly from the neck. The projection tube 52 is mounted with its face substantially parallel to the face of the tube 50, and the center of optical lens system 54 is positioned in a line between the center of the image area of the projection tube 52 and the center of the image area of the tube 50. In this way, the image formed by the projection tube 52 is thrown onto the inner face of the kinescope 50 so as to form a real image on the luminescent coating thereon in a manner described above.

Figure 6:
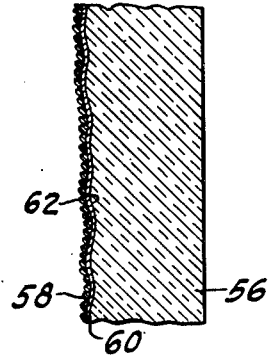
Figure 6 shows a cross sectional view of the face of a cathode ray tube which may be employed to improve the amount of diffused light reflected by the cathode ray tube on which the image is projected.

In an arrangement such as that shown in Figure 1 wherein the blue image is projected onto the front of the kinescope as distinguished from the arrangement shown in Figures 3-5 just discussed, a greater amount of the blue light may be reflected back to the observer by employing a structure such as illustrated in Figure 6. This figure is a cross sectional view of the face of a tube such as tube 10 of Figure 1 in which the numeral 56 indicates the customary relatively thick transparent glass wall and numeral 58 represents the phosphor that is normally deposited on the inner surface. In this arrangement, however, a layer 60 of high reflective material, such as an aluminum coating, is inserted between the phosphor 58 and the glass wall 56 and its outer surface 62 is sufficiently irregular to diffuse any light which falls upon it. The layer 60 is also thin or porous enough to transmit an adequate amount of the light generated in the phosphor 58. The advantage of this arrangement is derived from the fact that the surface of the layer 60 next to the glass wall 56 can be made more highly reflective than the phosphor 58, thereby making it a more efficient screen upon which the projected image will be shown.

Having thus described my invention, what is claimed is:

1. An apparatus for reproducing colored images comprising in combination a first cathode ray tube adapted to reproduce images that are representative of at least one component color on a first fluorescent screen, a second cathode ray tube adapted to reproduce images that are representative of a different component color on a second fluorescent screen, and optical means for projecting the images formed on said second fluorescent screen onto said first fluorescent screen in image registry.

2. An apparatus for reproducing colored images comprising in combination a first cathode ray tube adapted to reproduce images that are representative of one component color on a first fluorescent screen, a second cathode ray tube adapted to reproduce images that are representative of a different component color on a second fluorescent screen, and means for projecting the images formed on said second fluorescent screen onto said first fluorescent screen, a third cathode ray tube adapted to reproduce images that are representative of a third component color on a third fluorescent screen, and viewing means including a semi-reflecting mirror for viewing said first surface and said third surface simultaneously.

3. An apparatus such as described in claim 1 in which means are provided for making the cross sectional area of the beam of said second cathode ray tube with respect to the area of the image it creates greater than the ratio between the cross sectional area of the beam of said first tube to the area of its image.

4. An apparatus for reproducing colored images comprising in combination a first cathode ray tube adapted to reproduce images that are representative of one component color on a first fluorescent screen, a second cathode ray tube adapted to reproduce images that are representative of a different component color on a second fluorescent screen, and means for projecting the images formed on said second fluorescent screen onto said first fluorescent screen, a third cathode ray tube adapted to reproduce images that are representative of a third component color on a third fluorescent screen, and viewing means whereby said first and third surfaces appear to be superimposed.

5. An apparatus for reproducing colored images comprising in combination a first means for reproducing a colored image having intensity variations corresponding to a first component color on a first surface, a second means for reproducing a colored image having intensity variations corresponding to a second component color on a second surface, a semi-reflecting mirror, and means for projecting said first image onto said second surface via said mirror.

6. An apparatus for reproducing colored images comprising a first kinescope for reproducing an image of one component color, a second kinescope for reproducing an image of another component color, a single semi-reflecting mirror symmetrically positioned between the images formed by said kinescopes, a third kinescope for reproducing an image of a different component color, means for projecting the latter image so that it coincides with the image formed by one of said other kinescopes after being partially reflected by said semi-reflecting mirror.

7. An apparatus such as described in claim 5 in which the semi-reflecting mirror is half-silvered.

8. An apparatus such as described in claim 5 in which the semi-reflecting mirror is dichroic.

9. An apparatus such as described in claim 2 in which the third kinescope is smaller than the other two.

10. An apparatus such as described in claim 2 in which the third kinescope is equipped with means for projecting an electron beam having a greater cross-sectional area with respect to the area of the image it produces than the ratio between the cross-sectional area of the beam and the area of the images produced by the other tubes.

11. An apparatus for reproducing colored images comprising a cathode ray tube having a face coated with phosphor, said phosphor being adapted to luminesce in one component color, an electron gun adapted to project a beam of electrons toward said phosphor, and means adapted to cause said beam to scan a raster on said phosphor, a second cathode ray tube mounted with its axis substantially coinciding with the axis of the first cathode ray tube, said second cathode ray tube being adapted to reproduce images of a second component color, and an optical lens system adapted to project images formed on the face of the second cathode ray tube onto the face of the first cathode ray tube.

12. An apparatus for reproducing colored images comprising a first cathode ray tube having a screen including a coating of material that becomes luminescent in one component color when struck with electrons, an electron gun for projecting a beam of electrons onto one side of said screen, a mirror mounted within said cathode ray tube and at an angle with respect to the axis of the cathode ray tube, its reflecting surface being toward said screen, a second cathode ray tube, said second cathode ray tube being adapted to reproduce images in another component color, means for projecting images formed by said second cathode ray tube onto said same side of said screen of said first cathode ray tube via said mirror.

13. An apparatus for reproducing colored images comprising in combination a first cathode ray tube having an evacuated envelope and a luminescent screen mounted at the end of said envelope, said tube being adapted to reproduce images of a given component color, a second cathode ray tube, said second cathode ray tube being adapted to reproduce images of a different component color on its face, and optical means adapted to project an image produced on the face of the second cathode ray tube through the envelope onto the inner surface of the screen of the first cathode ray tube.

14. An apparatus for reproducing images in color comprising a first kinescope having a face, material deposited on said face that produces light of a given component color when struck by moving electrons, an electron gun adapted to direct a beam of electrons toward said face, means adapted to cause said beam to scan a given raster on said face, a second kinescope having a face, material deposited on said face that produces blue light when struck by a beam of electrons, an electron gun adapted to direct a beam of electrons toward said face and means adapted to cause said beam to scan a given raster on said face, the ratio of the cross-sectional area of the latter beam to the area of the raster it scans being at least two times larger than the ratio of the cross-sectional area of the beam of said first kinescope to the area of its raster, and means for projecting the blue image formed by the first kinescope onto the face of said first kinescope.

References Cited in the file of this patent

UNITED STATES PATENTS

| Number | Name | Date |
|---|---|---|
| 2,029,639 | Schlesinger | Feb. 4, 1936 |
| 2,335,180 | Goldsmith | Nov. 23, 1943 |
| 2,472,988 | Rosenthal | June 14, 1949 |
| 2,476,619 | Nicoll | July 19, 1949 |
| 2,480,848 | Geer | Sept. 6, 1949 |
| 2,552,070 | Sziklai | May 8, 1951 |
| 2,566,707 | Sziklai | Sept. 4, 1951 |
| 2,594,382 | Bedford | Apr. 29, 1952 |